(12) United States Patent
Huth et al.

(10) Patent No.: US 7,564,158 B2
(45) Date of Patent: Jul. 21, 2009

(54) THREE-PHASE SYNCHRONOUS MACHINE HAVING A PERMANENT MAGNET ROTOR WITH AN INDUCTION CAGE

(75) Inventors: Gerhard Huth, Leutershausen (DE); Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 414 days.

(21) Appl. No.: 10/572,008

(22) PCT Filed: Sep. 11, 2003

(86) PCT No.: PCT/DE03/03020

§ 371 (c)(1),
(2), (4) Date: Mar. 10, 2006

(87) PCT Pub. No.: WO2005/027321

PCT Pub. Date: Mar. 24, 2005

(65) Prior Publication Data

US 2007/0035193 A1  Feb. 15, 2007

(51) Int. Cl.
*H02K 17/00* (2006.01)
(52) U.S. Cl. ............ 310/166; 310/211; 310/254; 310/261
(58) Field of Classification Search ......... 310/166, 310/168, 171, 211, 254, 261, 179–184, 156.01
See application file for complete search history.

(56) References Cited

U.S. PATENT DOCUMENTS

| 1,933,591 | A |   | 11/1933 | Holtz et al. |
|---|---|---|---|---|
| 3,967,827 | A |   | 7/1976 | Lehmann |
| 4,371,802 | A | * | 2/1983 | Morrill ............... 310/166 |
| 4,393,344 | A | * | 7/1983 | Whellams ............ 318/759 |
| 4,453,101 | A | * | 6/1984 | Nelson ............... 310/211 |
| 6,844,652 | B1 | * | 1/2005 | Chu et al. ............ 310/216 |
| 2003/0071533 | A1 |   | 4/2003 | Kikuchi |

FOREIGN PATENT DOCUMENTS

| CH | 331 335 A | 7/1958 |
|---|---|---|
| DE | 51 083 | 4/1890 |
| DE | 23 18 728 B2 | 4/1977 |
| DE | 34 40 193 C2 | 7/1988 |

* cited by examiner

*Primary Examiner*—Thanh Lam
(74) *Attorney, Agent, or Firm*—Henry M. Feiereisen; Ursula B. Day

(57) ABSTRACT

The aim of the invention is to achieve a high torque yield in synchronous machines excited by permanent magnets. Said aim is achieved by using subharmonic air gap fields. The rotor comprises an induction cage as well as permanent magnets. The number of winding holes of the stator is greater than $q=0.5$. The number of poles of the rotor is greater than the base number of poles of the air gap field produced by the windings.

14 Claims, 5 Drawing Sheets

FIG 8

| P | $N_1=3$ | $N_1=6$ | $N_1=9$ | $N_1=12$ |
|---|---|---|---|---|
| 1 | | | | |
| 2 | | | | |
| 3 | | | | |
| 4 | 1/8 | | | |
| 5 | 1/10 | | | |
| 6 | | | | |
| 7 | 1/14 | 1/8 | | |
| 8 | 1/16 | 1/8 | | |
| 9 | | | | |
| 10 | 1/20 | 1/10 | | |
| 11 | 1/22 | 1/11 | | |
| 12 | | | 1/8 | |
| 13 | 1/26 | 1/13 | | |
| 14 | 1/28 | 1/14 | | 1/7 |
| 15 | | | 1/10 | |

THREE-PHASE SYNCHRONOUS MACHINE HAVING A PERMANENT MAGNET ROTOR WITH AN INDUCTION CAGE

BACKGROUND OF THE INVENTION

The invention relates to a three-phase synchronous machine having a rotor with permanent magnets and an induction cage.

Synchronous machines, particularly with permanent magnet excitation, are used for example as so-called servo drives in production machines, preferably machine tools. In order to increase the productivity in this case, it is necessary to keep not only the machining times but also so-called secondary times of the machine tools as short as possible. During the secondary times, drives are accelerated and are operated in rapid traverse. This phase requires the drives to have an acceleration capability for a short time. The acceleration capability depends on the masses to be accelerated and on the torque emitted from the respective drive. Particularly in the case of direct drives, the torques are of major importance, since there is no torque conversion via a gearbox.

SUMMARY OF THE INVENTION

In consequence, the invention is based on the object of providing an electrical machine, in particular a synchronous machine, which produces a comparatively high torque especially in the acceleration phase. The electrical machine should in this case be compact and should be usable for as many applications as possible, inter alia in the industrial field.

The stated object is achieved by a synchronous machine having a stator, having a winding system which has a fractional-slot winding for which $q \leq 0.5$, having a rotor which has permanent magnets and an induction cage for asynchronous use of subharmonic airgap fields, and in which the number of poles on the rotor of the synchronous machine is greater than the basic number of poles of the airgap field which is produced by the winding system of the stator.

In the sense of spectral analysis, the airgap field which is produced by the winding system of the stator includes, in addition to the desired number of working poles, which is also referred to as the basic number of poles of the stator, an infinite number of further harmonic winding fields, which in some cases also have subharmonic winding fields added to them. Until now, known motor concepts have made use only of the basic airgap field.

The design of the three-phase synchronous machine according to the invention now also makes use of the subharmonic winding fields, which revolve in the same direction as the synchronously used airgap useful field and are also referred to as positive phase sequence subharmonics, in conjunction with the induction cage for asynchronous torque formation. Winding systems are advantageous which have high winding factors both for the synchronously used airgap useful field and for the asynchronous subharmonic airgap field. The magnitude of the winding factor is in this case governed by the number of coil faces and the nature of their distribution on the circumference. It is thus dependent on the normal zone width or the number of coil faces per winding zone, on the amount of short-pitching and on the magnitude of the zone change. The winding factor can thus be subdivided into three factor elements; the zone factor, the short-pitching factor and the difference factor.

The stator is normally in the form of a slotted laminated core with axially running slots in which a three-phase winding is located. The winding system is in this case designed such that it is suitable for using at least two rotating fields with a different number of poles, but with the same rotation direction. In this case, the winding factor should be at least 0.5. This basic design of the three-phase synchronous machine is likewise suitable for conventional three-phase windings. However, particularly in the case of stator windings with tooth-wound coils, the subharmonic element can preferably be used efficiently to produce torque. In this case, the expression tooth-wound coils means concentrated coils which each comprise one mechanical pole or tooth, so that the forward and return conductors of the coil are arranged in immediately adjacent slots. The coils can in this case preferably be made available in a prefabricated form.

The permanent magnets are embedded either on the rotor surface or in the laminated core of the rotor. The induction conductor loops are located in slots in the rotor or between the permanent magnets when considered in the circumferential direction.

In a further embodiment, the induction cage and the permanent-magnet excitation are accommodated in parts of the rotor which are arranged axially one behind the other.

The difference from known synchronous machines with induction loops, for example synchronous motors with a damper cage, is, inter alia, that these known machines deliberately have scarcely any currents in the induction loop in the steady-state synchronous range, because the basic number of poles of the stator is made use of there, and the stators are designed for small harmonics. With respect to the number of poles used, there is therefore no subharmonic number of poles of the stator which can induce a current in induction loops in the rotor. The synchronous number of useful poles and the asynchronous number of useful poles are the same as the basic number of poles of the stator in known synchronous machines.

Owing to its advantageous torque response, a synchronous machine according to the invention is also suitable for traction drives for electrical prime movers, since the maximum torque is required in this case, particularly during the acceleration phase. A synchronous machine according to the invention can advantageously be used as a direct drive for prime movers by, for example, the shaft surrounding a section of the axle of a wheel set of the prime mover.

According to the invention, a compact, powerful synchronous machine such as this therefore represents an optimum drive for applications which require a maximum acceleration capability with a small physical volume, for example traction drives, machine tools or other production machines.

BRIEF DESCRIPTION OF THE DRAWING

Further advantageous refinements of the invention can be found in the dependent claims.

The invention as well as further exemplary embodiments are described in the schematically illustrated drawings, in which:

FIG. 8 shows an illustration of the matrix formed by the number of holes of possible winding variants as a function of the number of slots $N_1$ in the stator and the basic number of poles $p_{GS}$.

DETAILED DESCRIPTION OF PREFERRED EMBODIMENTS

Figure 1:
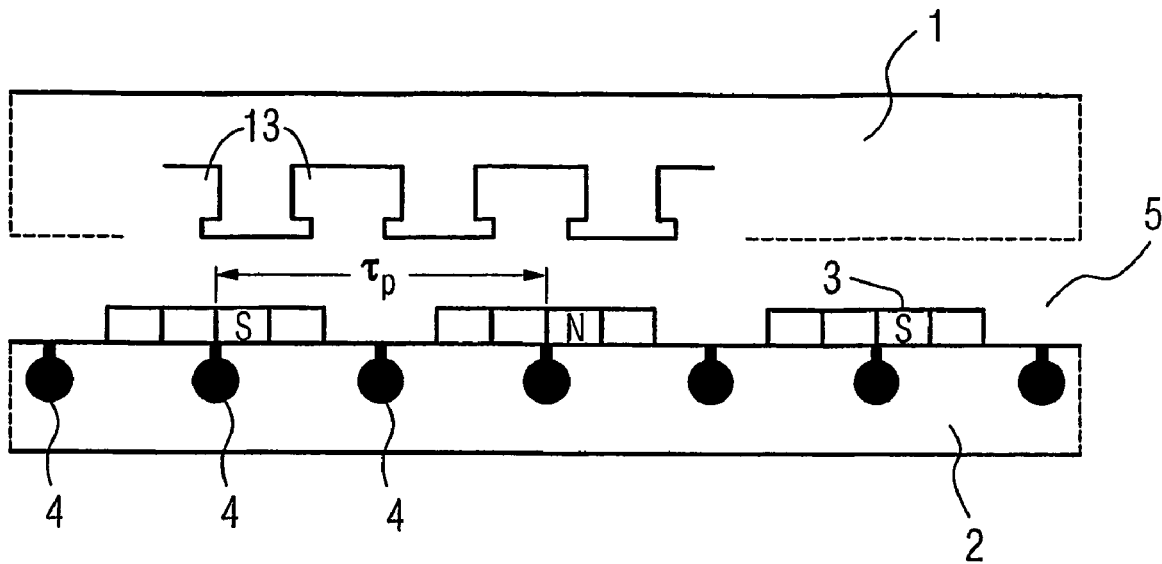
FIGS. 1, 2, 3 show a plurality of exemplary embodiments of a rotor with permanent-magnet excitation and a damper cage.

FIG. 1 shows an outline illustration of a stator 1 and of a rotor 2 of an electrical synchronous machine, which is not illustrated in any more detail. The rotor 2 is in this case positioned in a known manner on a non-magnetic shaft, which is not illustrated in any more detail. The permanent magnets 3 are arranged on the airgap 5 in the synchronous machine. The permanent magnets 3 are in this case mounted on the rotor 2 by means of intrinsically normal attachment means. The induction cage 4 is arranged radially underneath the permanent magnets 3 in the laminated core of the rotor 2, and the number of bars in this induction cage 4 is equal to twice the number of useful poles $2p_{NS}$ of the stator. The permanent magnets 3 are preferably composed of rare-earth magnets. The induction cage 4 can be manufactured in a similar way to squirrel-cage rotor motors made from aluminum or copper die-castings, or may be manufactured from soldered or welded bars. The induction cage 4 can likewise be formed from braided conductors.

Braided conductors are formed from individual filaments in each case, which may have different diameters and/or cross-sectional shapes. The stiffness or flexibility can be influenced in a manner that can be predetermined by the choice of the cross sections of the individual filaments of the braided conductor. The filaments may likewise have artificially applied insulation layers.

This makes it possible to further reduce the physical volume of a synchronous machine, if required.

The stator 1 produces airgap fields with an infinite number of poles. The smallest number of poles is referred to as the basic number of poles $2p_{GS}$ of the stator 1. The synchronously used number of poles is referred to as the number of useful poles of the stator 1, denoted by $2p_{NS}$. All the numbers of poles other than $2p_{NS}$ can induce voltages in the induction conductors of the rotor 2. The embodiments of the synchronous machine according to the invention ensure that currents are essentially induced in the induction conductor loops, that is to say in the induction cage 4, by a number of poles. This number of poles should be the asynchronously used number of poles $2p_{NA}$. This is less than the synchronously used number of poles, and may be equal to the basic number of poles $2p_{GS}$ of the stator 1.

$$2p_{GS} \leq 2p_{NA} < 2p_{NS}.$$

Figure 2:
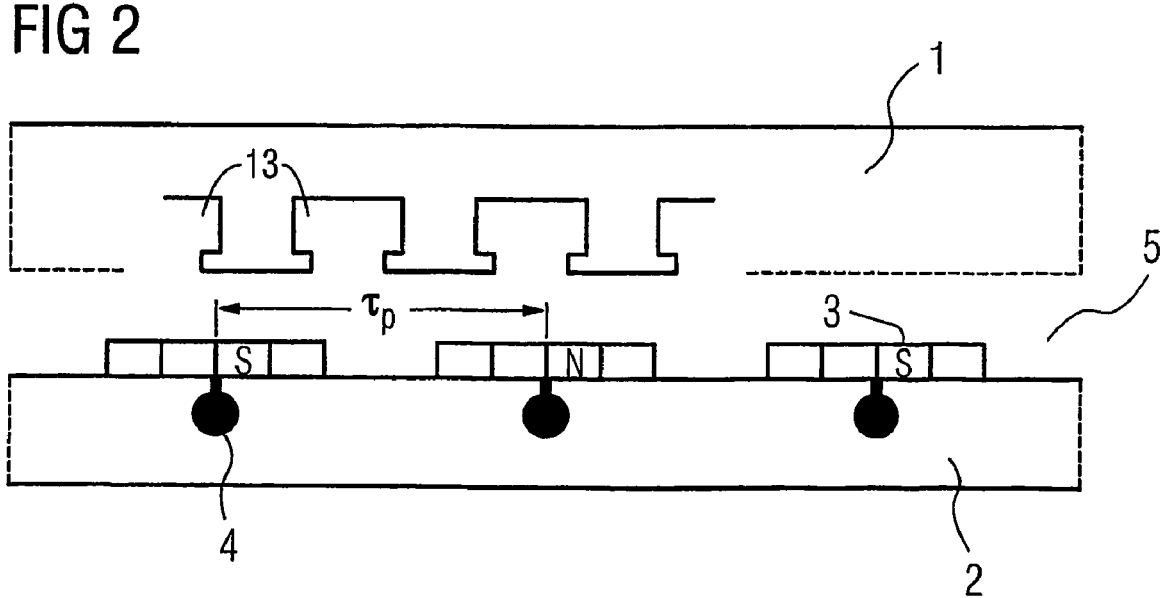

FIG. 2 shows a further embodiment of the rotor 2, in which the number of bars of the induction cage 4 corresponds to the number of useful poles $2p_{NS}$.

Figure 3:
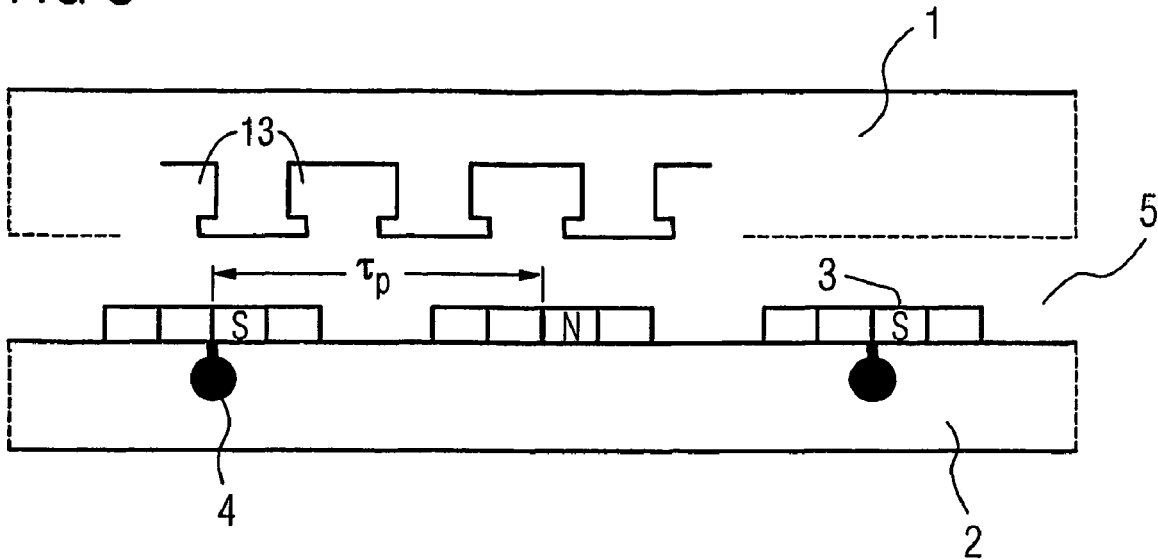
Figure 4:
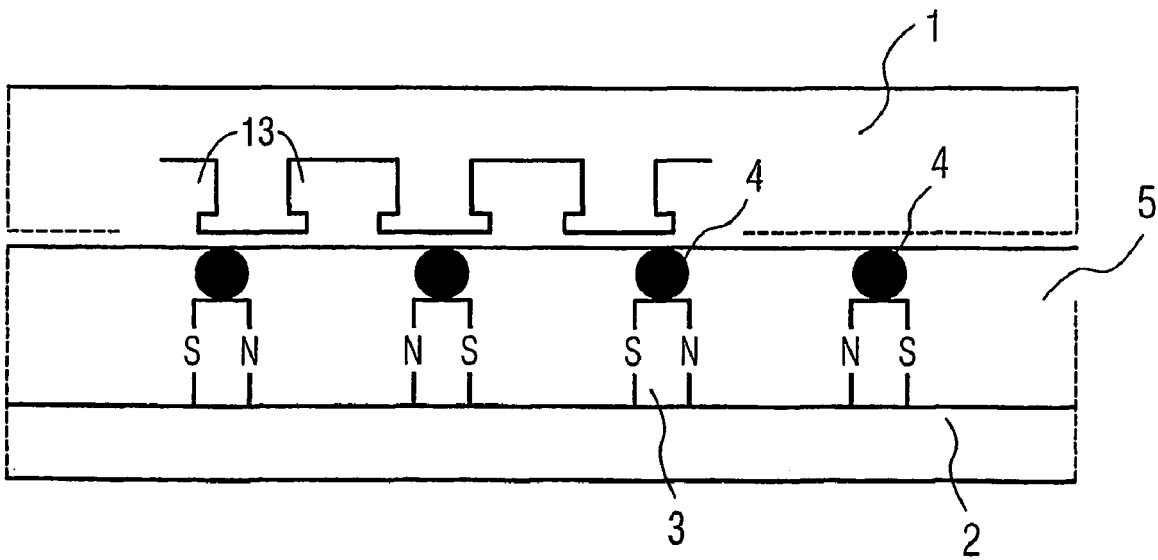
FIG. 4 shows a rotor with a flux concentration arrangement of the permanent magnets.

FIG. 3 shows an induction cage 4 of the rotor 2, in which the number of bars of the induction cage 4 corresponds to half the number of useful poles $2p_{NS}$.

As an alternative to the arrangement of the permanent magnets 3 on the airgap, permanent magnets 3 can also be integrally arranged in the laminated core of the rotor 2, based on the flux concentration principle. In this case, the permanent magnets 3 are arranged essentially radially within the induction cage 4.

Positive phase sequence subharmonics occur only in the case of fractional-slot windings of the stator 1, for which the denominator N of the number of slots q wherein $q=z/N$, is greater than 6, i.e. N>6; only those winding variants which are illustrated in FIG. 8 are therefore appropriate for this purpose.

The high additional acceleration torque resulting from the damping of the positive phase sequence subharmonics thus makes use for acceleration drives particularly advantageous. Synchronous machines such as these can be used advantageously in particular for production machines.

One significant design criterion is the rotation direction of the rotating fields. The rotation direction of $2p_{NA}$ must correspond to that of the synchronous number of useful poles $2p_{NS}$. The following criterion must therefore be satisfied:

$$2p_{NS}=2p_{NA}+i\times3, \text{ where } i=1, 2 \text{ etc.}$$

The set of stator pole numbers $2p_{ST}$ thus becomes:

$$2p_{ST}=2p_{GS}\ldots, 2p_{NS}\ldots; \text{ wherein } 2p_{ST} \text{ is equal to or greater than } 2P_{GS}, \text{ and } 2p_{NS} \text{ is greater than } 2P_{GS},$$

the number of rotor poles formed by permanent magnets becomes:

$$2p_{RS}=2p_{NS},$$

the number of rotor poles formed by induction conductor loops becomes:

$$2p_{RA}=\ldots, 2p_{NA}, \ldots$$

The ratio of the coil width $\tau_{Sp}$ to the width of the pole pitch $\tau_p$ is in this case in particular:

$$2.66 \leq \tau_{Sp}/\tau_p$$

and is less than 1.33 in known electrical machines. The pole pitch $\tau_p$ in this case denotes the distance between two poles of opposite polarity.

Figure 5:
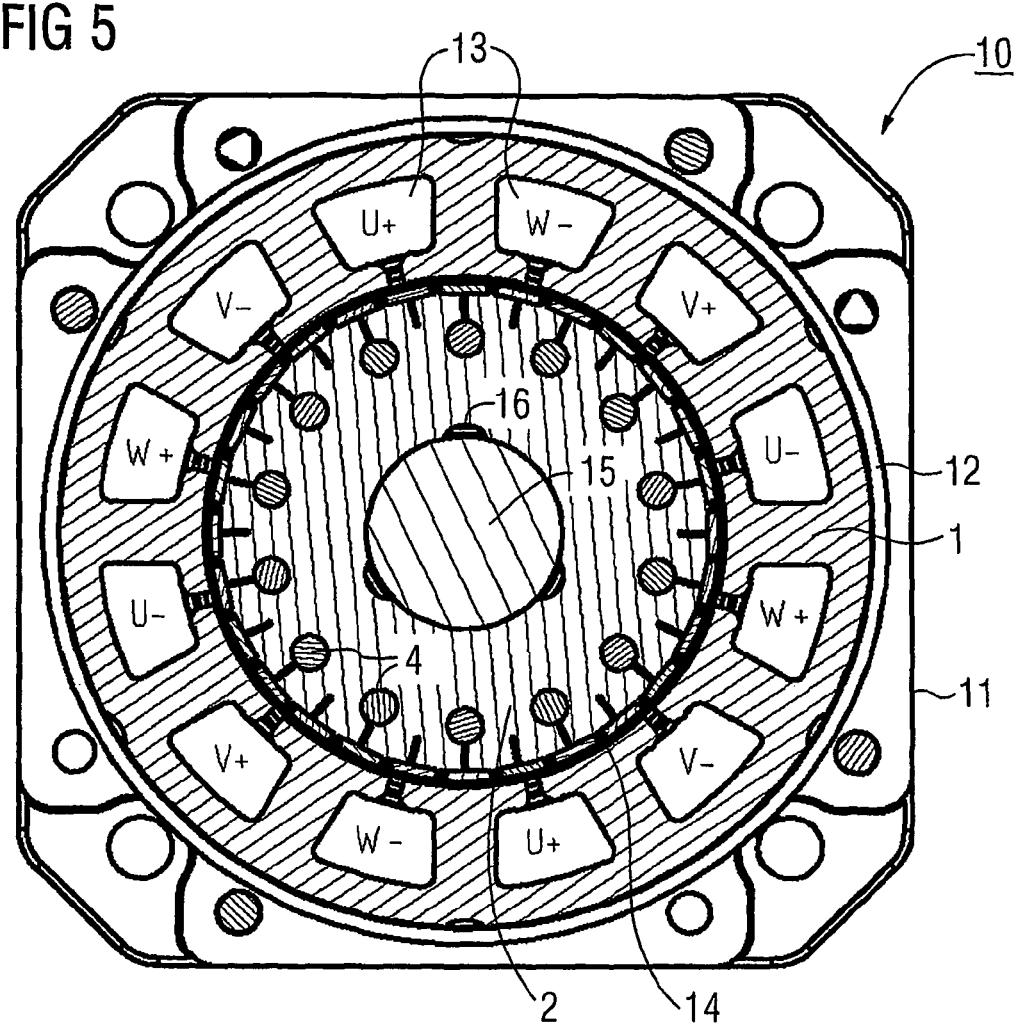
FIG. 5 shows a cross section through an electrical machine according to the invention.

FIG. 5 shows a synchronous motor 10 with permanent excitation, in which the stator 1 is in a housing 11. The stator 1 has uniformly distributed slots 13. A cooling jacket 12, which produces a cooling effect by means of liquid or gaseous media, and which is not illustrated in any more detail, may be located between the housing 11 and the stator 1. The winding systems U, V, W are located in the slots 13 in the stator 1. The rotor 2 has permanent magnets 3 on its external circumference, which are fixed to the rotor 2 by means of flexible bindings 14 or sleeves.

The permanent magnets 3 are designed to be planar or in the form of shells. The induction cage 4 is positioned radially underneath the permanent magnet 3. An output-driveshaft 15 is connected to the rotor 2, such that they rotate together, by means of suitable shaft/hub connections 16, such as matching springs, polygons etc.

Figure 6:
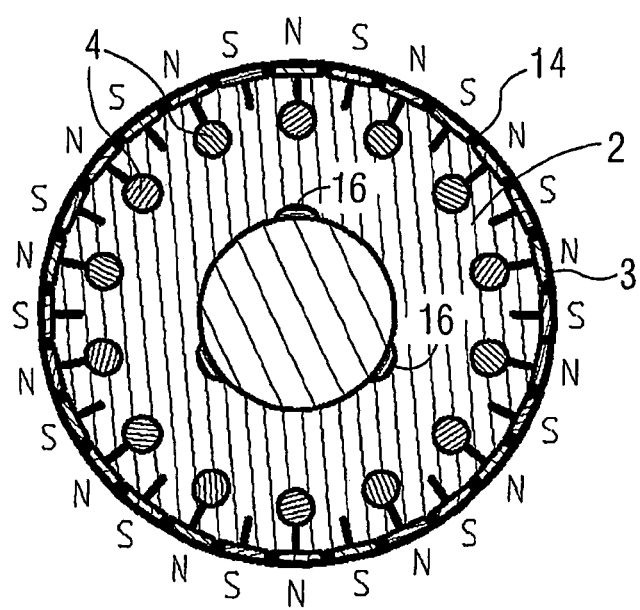
FIG. 6 shows a rotor for this electrical machine.

FIG. 6 shows a cross section through the rotor 2, designed in the same way as in FIG. 5, but with the additional pole designation N or S for the permanent magnets 3.

Figure 7:
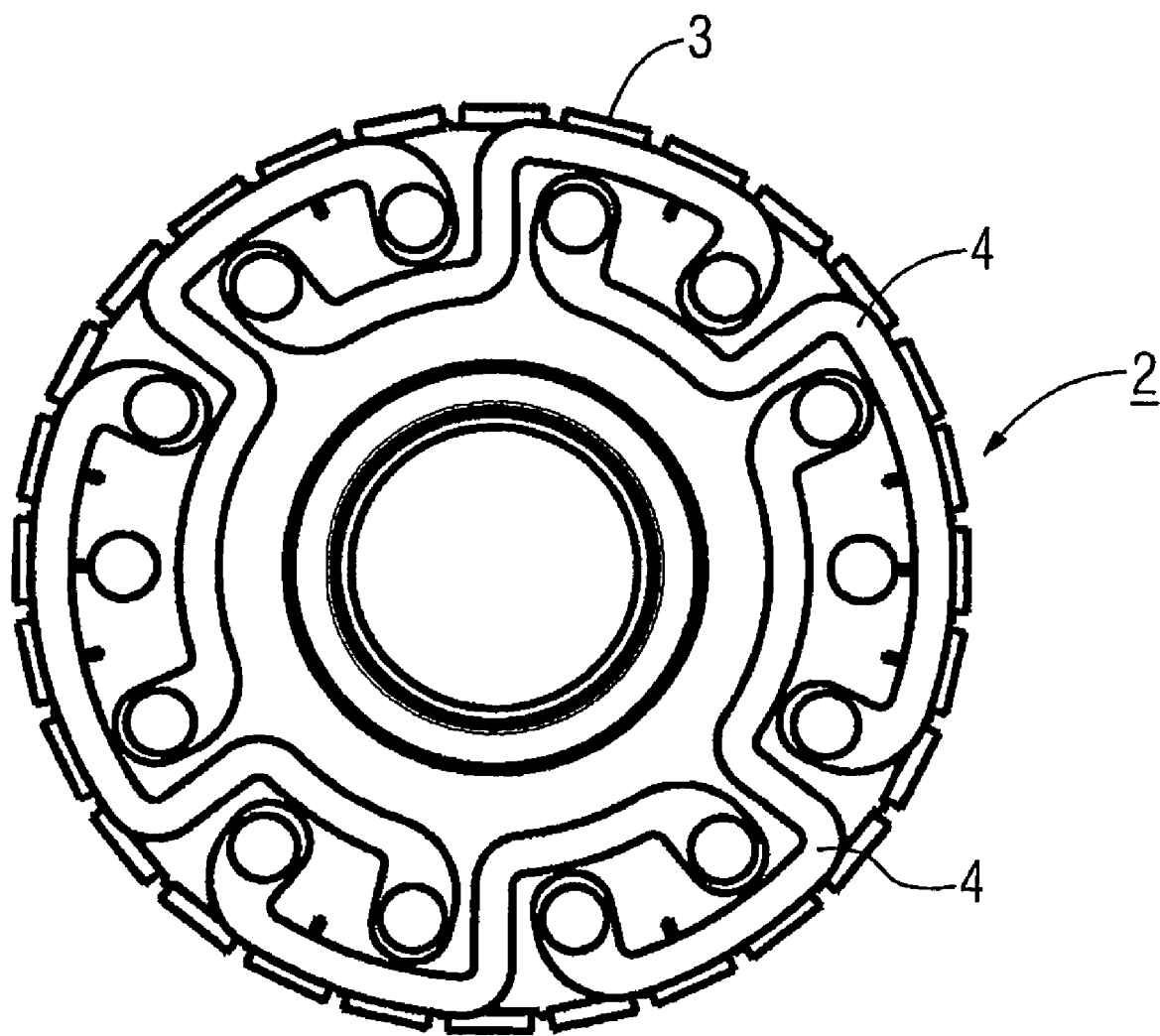
FIG. 7 shows a side view of the rotor for this electrical machine.

FIG. 7 shows a side view of the rotor 2, with the circuitry of the induction cages 4 additionally being shown in this case.

What is claimed is:

1. A three-phase synchronous machine, comprising
a stator having a winding system which has a fractional-slot winding with $q \leq 0.5$, wherein q is defined as a number of stator slots per rotor pole per phase, and
a rotor having permanent magnets and an induction cage for asynchronous use of subharmonic airgap fields, wherein a number of rotor poles is greater than a basic number of poles of an airgap field which is produced by the winding system of the stator.

2. The synchronous machine as claimed in claim 1, wherein the winding system of the stator has individual tooth-wound coils.

3. The synchronous machine as claimed in claim 1, wherein the permanent magnets of the rotor are arranged in a flux concentration direction.

4. The synchronous machine as claimed in claim 1, wherein the induction cage of the rotor is a symmetrical induction cage, with a pole pitch of the permanent magnets representing a symmetry unit.

5. The synchronous machine as claimed in claim 4, wherein the permanent magnets and the induction cage are arranged radially one above the other.

6. The synchronous machine as claimed in claim 4, wherein the induction cage is produced as a die-casting.

7. The synchronous machine as claimed in claim 4, wherein the induction cage is formed from braided conductors.

8. The synchronous machine as claimed in claim 1, wherein the stator has a basic number of poles $2p_{GS}$ and a synchronous number of useful poles $2p_{Ns}$, wherein $2p_{Ns} \geq 4 \times 2p_{GS}$.

9. Use of a synchronous machine as claimed in claim 1 in a traction drive or production machine.

10. The synchronous machine as claimed in claim 4, wherein the permanent magnets and the induction cage are arranged axially alongside one another.

11. The synchronous machine as claimed in claim 6, wherein the die casting is made of copper.

12. The synchronous machine as claimed in claim 6, wherein the die casting is made of aluminum.

13. The synchronous machine as claimed in claim 8, wherein current is induced in the induction coil by an asynchronous number of poles which is defined by $2p_{Na} \geq 2p_{GS}$.

14. The synchronous machine as claimed in claim 8, wherein a ratio of a coil width $\tau_{Sp}$ to a pole pitch $\tau_p$ of the permanent magnets is $2.66 \leq \tau_{Sp}/\tau_p$.

* * * * *